Dec. 22, 1953
B. YELLIN
2,663,172
TABLE STAND FOR HOT CASSEROLE DISHES
Filed April 14, 1952
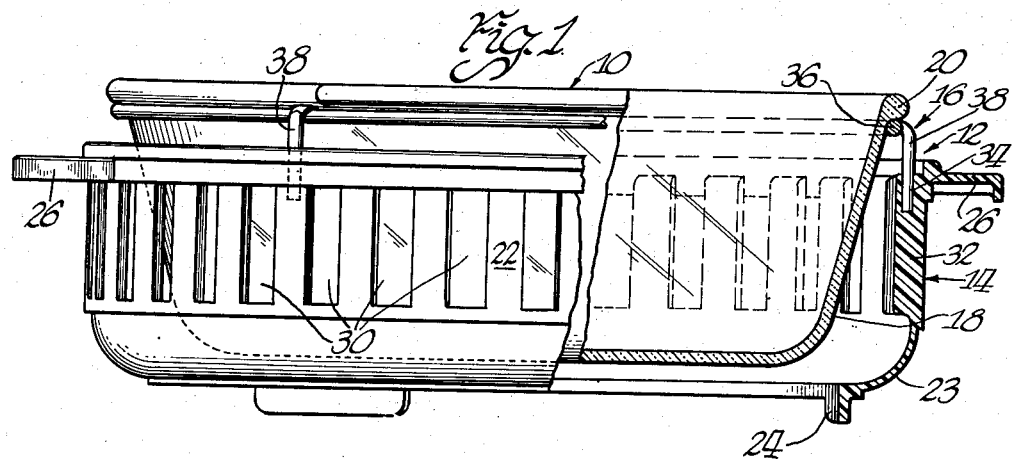
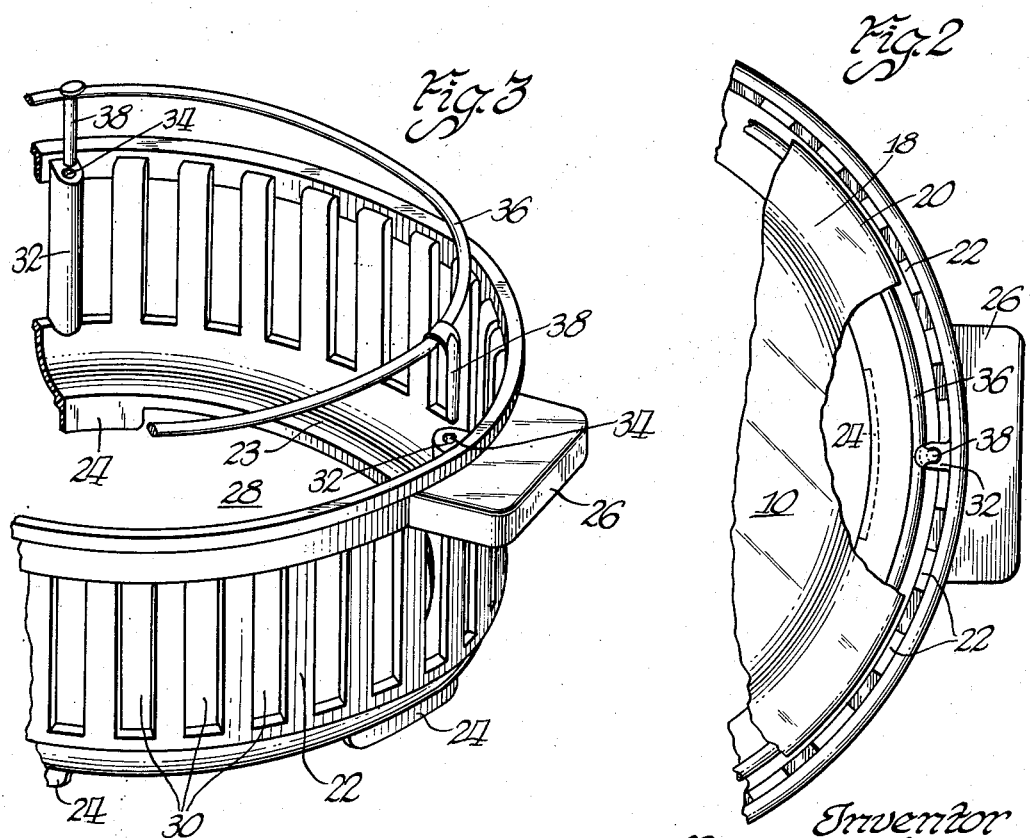
Inventor
Bernard Yellin
by Bair, Freeman & Molinare
Attys.

Patented Dec. 22, 1953

2,663,172

UNITED STATES PATENT OFFICE 2,663,172

TABLE STAND FOR HOT CASSEROLE DISHES

Bernard Yellin, Chicago, Ill., assignor to Bernard Edward Co., Chicago, Ill., a corporation of Illinois Application April 14, 1952, Serial No. 282,241

5 Claims. (Cl. 65—61)

This invention relates to a novel table stand for a hot casserole dish or the like and more particularly to a table stand formed in part of a heat insulating thermoplastic material.

Although products made of thermoplastic materials have recently found wide use in homes, the use of thermoplastic materials is often limited to applications where the product is not subjected to large quantities of heat, or to temperatures much higher than room temperatures. Thermoplastic materials have been particularly successful when made into accessories for use on the dining table. Such dining table accessories are often brightly colored and present such an attractive appearance that, to a large extent, they are supplanting metallic and ceramic table accessories.

Heretofore, however, thermoplastic table accessories for use as supports for "hot" bodies such as casserole dishes have been unsuccessful, because the high temperatures and large quantities of heat supplied by the casserole dish and its contents often damage the portions of the thermoplastic article which are adjacent to or which contact the hot body.

The portions of the thermoplastic article which are contacted by or are positioned adjacent to the hot body often become discolored or burned, thus destroying the attractive appearance of the article; or the article may develop surface cracks which eventually result in structural failure of the article; or the article may develop "bumpy" surfaces caused by plastic flow of the thermoplastic material.

Thus, one of the objects of this invention is to provide a support for hot bodies which is formed in part of thermoplastic material molded into an attractive article and wherein means are provided for avoiding direct contact of the hot body with the thermoplastic article, whereby thermal damage of the article is avoided.

Another object of this invention is to provide a table support for hot casserole dishes, which support is formed in part of thermoplastic materials, and wherein the heat transfer from the hot casserole dish to the thermoplastic support is substantially reduced, whereby thermal damage to the thermoplastic material is avoided.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawing, in which—

Figure 1 is a side elevation view, with parts broken away, of my novel dining table support for hot casserole dishes, and showing a casserole dish supported thereby;

Figure 2 is a partial top plan view of my hot casserole dish support shown in Figure 1; and Figure 3 is a partial isometric and exploded view of my novel dining table support for hot casserole dishes.

Referring now to the figures, there is shown in Figure 1 a casserole dish, generally indicated by numeral 10, positioned in a support, generally indicated by numeral 12. My casserole dish support includes a thermoplastic body portion, generally indicated by numeral 14, and a casserole contacting member, generally indicated by numeral 16.

The casserole dish 10 has upwardy diverging side walls 18 which terminate in their upper edges in an enlarged bead 20 which extends outwardly of the side wall 18 of the casserole dish. This bead 20 generally is continuous and extends around the entire upper edge of the casserole dish, but in some cases this bead is intermittent. In any event, whether the bead is intermittent or continuous is of no importance with respect to this invention, except in the manner that the bead cooperates with the means for supporting the casserole dish.

The thermoplastic portion 14 of my novel support 12 includes a continuous upright side wall 22 which surrounds a space in which the casserole dish 10 is positioned. The lower ends of side walls 22 are curved inwardly as at 23 and have supporting legs 24 formed integral therewith and depending therefrom. The thermoplastic support portion 14 is also provided at opposite sides thereof with a pair of lateral flanges 26 formed integral with the remainder of the thermoplastic body. These lateral flanges 26 afford means for carrying both the support and casserole dish.

The plastic support portion 14 has an open bottom 28 which is clearly seen in Figure 3. The upright side walls 22 have a plurality of vertical slots 30 therein. The open bottom 28 and the open vertical slots 30 permit the convection of air through the plastic support portion 14 for the purpose of providing a flow of cooling air through the space enclosed by the plastic support portion 14. In this way heat transfer from the hot casserole dish to the adjacent plastic body is substantially reduced. Furthermore, the vertical slots 30 and open bottom 28 provide for reduction in the amount of thermoplastic material used in the support. Variations may be made in the size and shape of the openings 28 and 30 so as to provide a thermoplastic accessory with an attractive appearance.

Formed interiorly of the walls 22 are a plurality of bosses 32 having vertical recesses 34 therein. The casserole contacting member 16 includes a continuous ring 36 and a plurality of depending legs 38 which are adapted to be positioned in recesses 34 of the bosses 32. The ring 36 and the depending legs 38 are preferably formed of metal. The ring 36 has substantially the same contour as the bead 20 of the casserole dish and is adapted to engage the under edge of the bead 20 to support the casserole dish thereby, as clearly shown in Figure 1. The depending legs 38 are offset radially outwardly from the ring 36 as clearly shown in Figures 1 and 3. This offsetting of the depending legs 38 from the ring 36 provides that the ring and casserole are in engagement over the entire length of the ring and, in a way, reduces the direct heat transfer from the hot casserole dish to the depending legs 38, which are not in direct contact with the casserole. Although the depending legs 38 are also made of metal and are therefore fairly good heat conductors, the spacing of these legs from direct contact with the casserole dish, results in reduction of heat transfer from the casserole dish to the legs 38 and consequently to the bosses 32 in the thermoplastic support.

The shape and arrangement of the thermoplastic portion 14 of the support in relation to the metallic contacting member 16 is such that the ring 36 is spaced inwardly of the upright walls 22 of the plastic support and is also spaced above the upper edge of the walls 22. This results in the spacing of the walls 18 of the casserole dish from the walls 22 of the thermoplastic support and reduces the possibility of heat transfer from the hot casserole dish to the spaced walls 22.

The bosses 32 in the plastic support 14 are of fairly large mass relative to the walls 22 and are adapted to receive the heat that is conducted by depending legs 38 with as little damage as possible to both the bosses 32 and to the adjacent portions of the side wall 22.

The cooling air which moves by convection through the open bottom 28 and through the vertical slots 30 is directed over the metal ring 36 and supporting legs 38 and, thuswise, further assists in reducing the heat transfer to the thermoplastic portion of the support.

When the casserole dish is supported in the thermoplastic support, the metallic ring is practically unnoticeable and the thermoplastic support provides a very attractive table appliance. Thus it can be seen that I have provided a novel thermoplastic appliance for supporting hot casserole dishes wherein undesirable heat transfer from the hot casserole dish to the thermoplastic support is substantially reduced.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new, and desire to secure by Letters Patent of the United States, is:

1. A table stand for use with a casserole dish, which dish has a bead along portions of the upper edge thereof which extend outwardly of the wall of the casserole dish, said table stand comprising a plastic support having a continuous upright side wall and an open top, a plurality of bosses formed interior of said side walls and having recesses therein, a continuous metal ring, a plurality of legs depending downwardly from said ring and positioned in the recesses of said bosses, said ring being spaced inwardly of the walls of said plastic support and above the upper edge of said walls, said ring adapted to have a casserole dish inserted therein with the bead of the casserole dish in engagement therewith, whereby the casserole dish is supported by said table stand.

2. A table stand for use with a casserole dish, which dish has a continuous bead along the upper edge thereof which extends outwardly of the wall of the casserole dish, said table stand comprising a support formed of heat insulating thermoplastic material and having a continuous upright side wall surrounding a space in which the casserole dish is positioned, a continuous metal ring adapted to support said casserole dish therefrom, a plurality of bosses formed interior of the side walls of said support and having recesses therein, a plurality of legs depending downwardly from said ring and positioned in the recesses in said bosses, said depending legs being offset radially outwardly from the ring, whereby only the casserole dish and ring are in direct contact so as to reduce the heat transfer from the casserole dish to said depending legs.

3. A table stand for use with a casserole dish, which dish has a bead along portions of the upper edge thereof which extend outwardly of the wall of the casserole dish, said table stand comprising a plastic support having a continuous upright side wall and an open top, a plurality of bosses formed interior of said side walls and having recesses therein, a continuous metal ring, a plurality of legs depending downwardly from said ring and positioned in the recesses in said bosses, said ring being spaced inwardly of the walls of said plastic support and above the upper edge of said walls, said ring adapted to have a casserole dish inserted therein with the bead of the casserole dish in engagement therewith, whereby the casserole dish is supported by said table stand, and said depending legs being offset radially outwardly from the ring, whereby only the casserole dish and ring are in direct contact so as to reduce the heat transfer from the casserole dish to said depending legs.

4. A table stand for use with a casserole dish, which dish has a bead along portions of the upper edge thereof which extend outwardly of the wall of the casserole dish, said table stand comprising a plastic support having a continuous upright side wall and an open top, a plurality of bosses formed interior of said side walls and having recesses therein, a continuous metal ring, a plurality of legs depending downwardly from said ring and positioned in the recesses in said bosses, said ring being spaced inwardly of the walls of said plastic support, said ring adapted to have a casserole dish inserted therein with the bead of the casserole dish in engagement therewith, whereby the casserole dish is supported by said table stand, and said support having apertures therein spaced below said metal ring, whereby cooling air will move by convection through said apertures and over said metal ring.

5. A table stand for use with a casserole dish, which dish has a continuous bead along the upper edge thereof which extends outwardly of the wall of the casserole dish, said table stand comprising a support formed of heat insulating thermoplastic material and having a continuous upright side wall surrounding a space in which the casserole dish is positioned, a continuous metal ring adapted to support said casserole dish therefrom, a plurality of bosses formed interior of the side walls of said support and having recesses therein, a plurality of legs depending downwardly from said ring and positioned in the recesses in said bosses, said depending legs being offset radially outwardly from the ring, whereby only the casserole dish and ring are in direct contact so as to reduce the heat transfer from the casserole dish to said depending legs, said metal ring being spaced inwardly of the walls of said plastic support, and said support having apertures therein spaced below said metal ring, whereby cooling air will move by convection through said apertures and over said metal ring.

BERNARD YELLIN.

References Cited in the file of this patent

UNITED STATES PATENTS

| Number | Name | Date |
| --- | --- | --- |
| D. 51,061 | Frayser | July 24, 1917 |
| 72,770 | Woods et al. | Dec. 31, 1867 |
| 392,105 | Chapman | Oct. 30, 1888 |
| 597,350 | Anschutz | Jan. 11, 1898 |
| 1,386,516 | Leahy | Aug. 2, 1921 |
| 1,429,763 | O'Mara | Sept. 19, 1922 |
| 1,528,713 | Weirick | Mar. 3, 1925 |
| 1,742,078 | Jacobs | Dec. 31, 1929 |
| 1,997,529 | Miller | Apr. 9, 1935 |
| 2,119,342 | Morris | May 31, 1938 |
| 2,547,844 | Wickland | Apr. 3, 1951 |

FOREIGN PATENTS

| Number | Country | Date |
| --- | --- | --- |
| 26,782 | Switzerland | May 13, 1902 |